United States Patent [19]

Leeson et al.

[11] Patent Number: 4,984,505
[45] Date of Patent: Jan. 15, 1991

[54] MULTIPLEXED HYDRAULIC CONTROL SYSTEMS

[75] Inventors: Plato J. Leeson, Rockford; John W. Wardle, Roscoe, both of Ill.

[73] Assignee: Woodward Governor Company, Rockford, Ill., ; G1 5 09141990 17 01151991 ZZX None 34 1 1 Look; Edward K. 8 10 074302696 16

[21] Appl. No.: 306,842

[22] Filed: Feb. 1, 1989

[51] Int. Cl.$^5$ ............................................. F15B 13/16
[52] U.S. Cl. ...................................... 91/361; 91/457; 91/527; 91/536; 137/596.17; 137/637.4
[58] Field of Search .......... 91/521, 522, 524, 527–530, 91/534, 535, 536, 361, 365, 461; 137/596, 596.17, 637.4

[56] References Cited

U.S. PATENT DOCUMENTS

| | | | |
|---|---|---|---|
| 685,510 | 10/1901 | Flint | 137/637.4 X |
| 3,645,141 | 2/1972 | Moore et al. | |
| 3,747,472 | 7/1973 | Knutson | 91/529 X |
| 4,026,396 | 5/1977 | Hubl et al. | 137/637.4 X |
| 4,191,215 | 3/1980 | Gonner | |
| 4,271,867 | 6/1981 | Milberger et al. | |
| 4,325,127 | 4/1982 | Major | |
| 4,595,036 | 6/1986 | Johnston | 137/596 X |
| 4,622,998 | 11/1986 | Kussel et al. | 91/529 X |
| 4,638,720 | 1/1987 | McKee et al. | 91/529 X |
| 4,664,136 | 5/1987 | Everett | |
| 4,712,173 | 12/1987 | Fujiwara et al. | 91/361 X |
| 4,838,145 | 6/1989 | Slocum et al. | 91/536 |

FOREIGN PATENT DOCUMENTS 1259163 1/1968 Fed. Rep. of Germany ... 137/637.4

OTHER PUBLICATIONS

"Imagine ... A Self-Calibrating Pressure Transducer", advertisement for Scanivalve Corp., San Diego, CA; Sep. 1987.
"Metering Valve w/Regulator", article, Tech Data South Bend Controls Inc. Bulletin, PV-210, SBC, 1987.
"Metering Valve", article, Tech Data South Bend Controls Inc. Bulletin, PV-211, SBC, 1987.

Primary Examiner—Edward K. Look
Attorney, Agent, or Firm—Leydig, Voit & Mayer

[57] ABSTRACT

A time division multiplexed (TDM) hydraulic control system having a plurality of channels, each channel having a servo actuator. Electrical demand signals are arranged in TDM sequence and applied to a single multiplexed pilot valve so that the pilot valve produces a plurality of hydraulic signals. Commutator means are associated with the pilot valve for distributing the hydraulic signals to the associated channels. In order to achieve useful output flow rates in the channels, each channel includes a second stage valve which integrates the hydraulic signals for its channel to produce an output flow rate which is a function of the integrated signal. The flow rates are continuously produced (as compared to the multiplexed output signals) and are coupled to actuators in the channels for controllably adjusting the position thereof. Feedback means associated with the actuators includes rate feedback for stabilizing the multiplexed control loops.

34 Claims, 8 Drawing Sheets

MULTIPLEXED HYDRAULIC CONTROL SYSTEMS

This invention relates to fluid power control systems, and more particularly to hydraulic systems in which a plurality of hydraulic actuators are to be precisely positioned in dependence on the magnitude of a similar plurality of electrical control signals.

There are numerous such control systems, and this invention would represent a significant advantage in connection with many of them. One exemplary and very significant application of such controls is in aircraft systems where hydraulic controls are provided for adjusting mechanical variables in jet aircraft engines. The gas turbine engines which are used to power conventional jet aircraft have commonly used hydraulic actuators for control of air valves, fuel valves, engine variable geometry, and the like. As engine designers attempt to achieve more and more performance from the gas turbine, the number of hydraulic actuators has increased significantly, and may approach 17 in number. Even gas turbine engines used on older commercial aircraft typically have on the order of six hydraulic actuators. In many cases, the actuators control functions which are critical, such as fuel supply, and on such critical functions, if control is lost, so is the engine.

Heretofore, each hydraulic actuator was provided with a device to convert an electrical input signal into a mechanical position of the actuator. Most typically, that had been done with a torque motor connected to and driving a hydraulic servo valve; the servo valve, in turn, controlled the supply of hydraulic fluid to the actuator. Both torque motors and servo valves are fairly expensive, and both are fairly weighty components, particularly for aircraft applications where weight savings on the order of pounds can translate into substantial operating cost savings over the life of the aircraft.

Applicants are aware of a concept having been proposed to reduce weight and cost in such systems, by using a single pilot valve multiplexed among a plurality of actuators. In substance, the pilot valve has a spool which is rotated for multiplexing and which is positioned vertically by the torque motor to establish control positions. The spool and valve would be modified to provide a plurality of ports at different angular positions of the spool such that the vertical control position of the valve combined with a plurality of angular multiplex positions could be used to sequentially deliver hydraulic fluid to a plurality of actuators. A position sensor on the rotary multiplexer would be used to coordinate multiplexed electrical signals for the pilot valve with the time slots of the multiplexer.

It is applicant's belief that a system of that type could not be reduced to practice for any but the most rudimentary systems because of a number of limitations, the most prominent one being the substantially reduced flow rate to any given actuator for a servo valve of any reasonable size. The flow rate reduction is a result of two factors—1) reduced flow through a pilot valve which is configured as a multiplexer, and 2) the fact of multiplexing itself which has flow going to an actuator only during its time slot. For a three channel system, the flow rate per cycle as compared to a standard non-multiplexed pilot valve would be reduced by about a factor of 18. Thus, while in principle the system might work in applications where speed of response and fineness of control are not important criteria, in a jet engine control, for example, the concept would not appear to be workable.

Multiplexing of hydraulic circuits is not broadly new. It can be used for example in sharing a single transducer among a number of hydraulic or pneumatic channels, such as illustrated in Moore et al. U.S. Pat. No. 3,645,141. The opportunity to share a control servo valve among multiple actuators is also suggested in the literature, but not on a simultaneous real time basis, insofar as applicant is aware. Applicants, however, know of no application where multiplexing has been successfully used in control of high performance hydraulic systems such as for gas turbine engine control, where the requirements are for precise position control, a wide range of controllable actuator speeds, and a demand, at least for some channels, of high speed controlled movement of the actuator. Thus, while a pressure sensing application (e.g., Moore) can be configured to share a single transducer among multiple channels, because no substantial fluid flow is required for that application, and while in low performance applications it may be possible to selectively connect different hydraulic circuits to a single servo valve, it has not heretofore been possible to accurately control a plurality of high performance actuators which require substantial fluid flow to generate adequate force or sufficient rate of movement in a hydraulically multiplexed system. It is for those reasons, perhaps among others, that designers have traditionally thought in terms of one control for one actuator in applications like aircraft engines where a plurality of such actuators must be capable of simultaneous action and have a relatively high fluid flow rate needed in order to meet performance requirements.

The concept of hydraulic amplification is also known, and is used, for example, where the flow rate required by an actuator is much higher than the flow capacity of an associated pilot valve. A second stage valve can be used in those systems in which the flow from the pilot valve sets a position for the second stage valve which in turn controls a higher flow rate through the second stage valve to an actuator. However, it is appreciated by those utilizing such devices that the second stage valve and the actuator are both integrators and are connected in series, and thus such systems require feedback, typically in the form of a mechanical connection such as a spring from the second stage valve to the pilot in order to stabilize the loop in which they are used. Insofar as applicants are aware, the second stage to pilot feedback has restricted the use of such systems to non-multiplexed systems because the mechanical linkage dedicates the pilot and the second stage valve to the single control loop in which they are placed.

In view of the foregoing, it is a general aim of the present invention to provide a practical and reliable multiplexing fluid power control for high precision servo systems.

In that regard, it is an object of the present invention to provide a reliable highly accurate multiple channel hydraulic control in which the control elements are shared among a plurality of actuators without substantial sacrifice of positioning speed or accuracy.

According to one aspect of the invention, an object is to provide such a control capable of meeting the control requirements for modern gas turbine engines.

According to that aspect of the invention, it is an object to provide a multiple channel hydraulic control for an aircraft engine which is more reliable than systems made up of individual channel controls known heretofore, and which presents a savings in weight and cost.

It is a feature of the present invention that size and weight reduction are achieved by multiplexing a single pilot valve without substantial sacrifice of actuator response time or accuracy by virtue of interposing a hydraulic sample and hold device, in the nature of a second stage valve, between the pilot valve and actuator. The second stage valve integrates hydraulic signals from the pilot valve to control continuous hydraulic fluid flow to the actuator, with additional hydraulic signals from the pilot being required only when it is necessary to alter the actuator rate of change of position.

It is a further advantage of such a system that a given number of actuators can be controlled with less electrical power than has been required in the past. In non-multiplexed systems, electrical power is required for each pilot valve at all times. That requirement is relaxed in the prior multiplexed servo valve concept described above, but by virtue of the discontinuous flow to the actuator, substantial electrical power remains a requirement. Since, in the prior concept, the actuator is only moved when it is supplied additional fluid from the multiplexed pilot valve, during rapid movement of the actuator, each pulse of fluid to the actuator can require full pilot valve travel, and many such pulses would be necessary for substantial movement. By way of contrast, in the system according to the present invention, electrical power need be coupled to the pilot valve only when it is desired to change the rate of movement of the actuator.

It is a further feature of the invention that it is more reliable than the non-multiplexed systems of the past. While at first glance it might appear to be less reliable in that multiple actuators rely on only a single pilot valve, when it is appreciated that in past systems failure of a particular pilot valve can cause a complete system failure, it will be understood that the reduced number of parts in the present multiplexed system renders the system as a whole more reliable.

Other objects and advantages will become apparent from the following detailed description when taken in conjunction with the drawings, in which.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

The systems to which attention will be primarily directed below can be considered time division multiplexed because they utilize a rotary commutator of one form or another for sequentially distributing hydraulic signals to each of the channels in turn. As a result, since the rotary motion of the commutator cycles past each of the channel ports during each cycle, individual time slots can be assigned to each channel, fitting the classic definition of a time division multiplexed system. However, the invention can be considered broader than requiring time division multiplexing in all of its aspects. More particularly, utilizing a nonrotary distribution means, such as an array of selector valves with a multiplexed pressure source, it is possible to achieve the result of multiplexing multiple hydraulic channels without dedicating a time slot in each cycle to each channel. For example, channels can be selected only on demand, or preferably most of the channels can be selected on a time division basis with a few of the less critical channels selected only on demand. In such systems, some or all of the channels will not have a dedicated time slot and the system will not fit the classical definition of time division multiplexing. The term time multiplexed is used herein to encompass such systems in which time slots are not necessarily dedicated to specific channels, but the channels are serviced at different points in time to achieve the multiplexed result.

In the exemplary embodiments, emphasis is placed on fluid power control systems of the hydraulic type because that is the preferred practice of the invention, particularly for aircraft applications. However, some of the benefits of the invention can be achieved in fluid power systems of the pneumatic variety. Such pneumatic fluid power systems are less preferred for a number of reasons including their inherently slower response time. However, in applications where speed is less critical, it is possible to practice the present invention with such systems and still achieve the size and weight reduction which is described herein.

Figure 1:
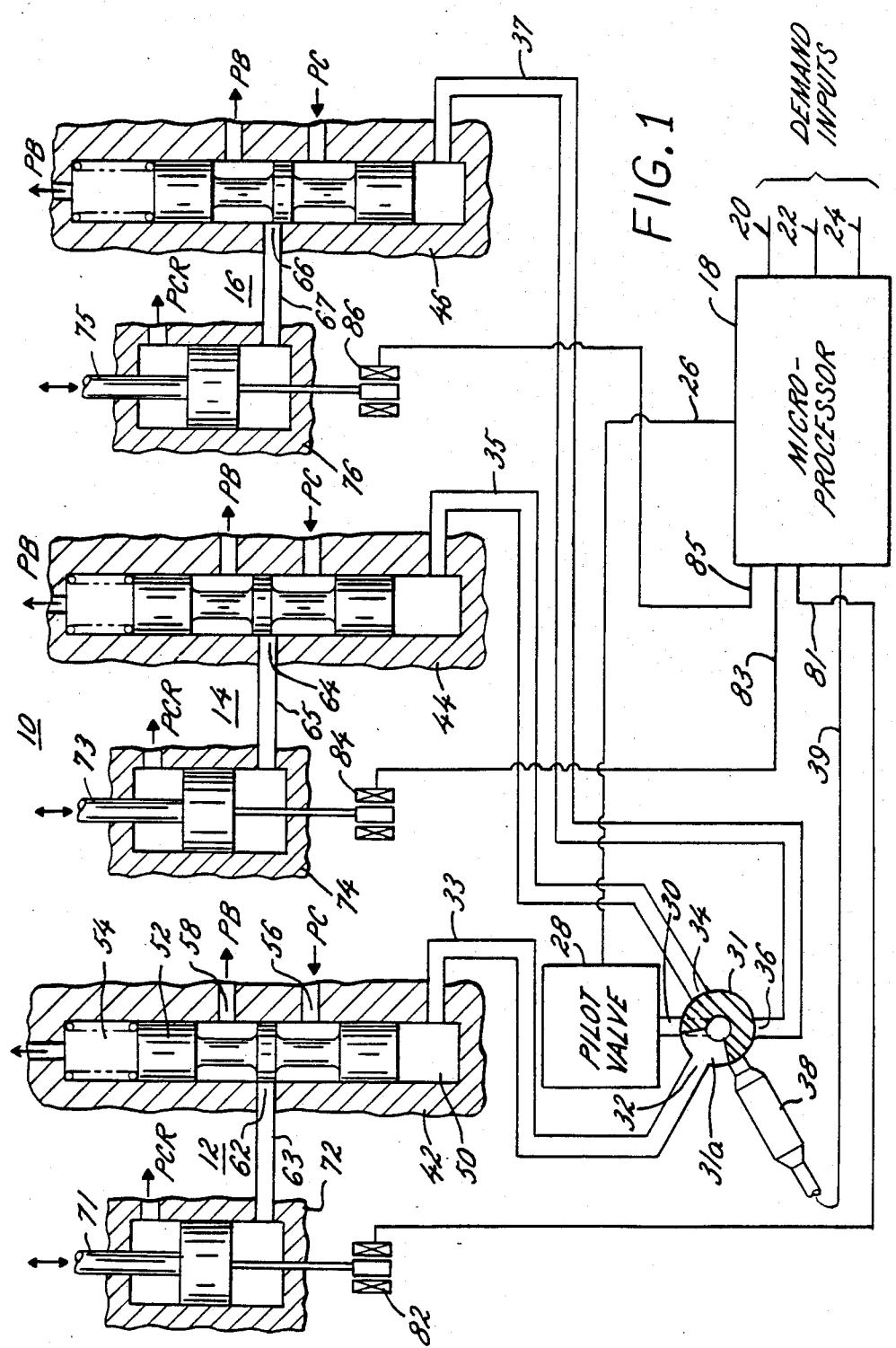
FIG. 1 is a schematic illustration showing a three actuator multiplexed system exemplifying the present invention.

Turning now to the drawings, FIG. 1 illustrates, partly in schematic form, the major elements of a hydraulic multiplexed control system exemplifying the present invention. More particularly, FIG. 1 illustrates a hydraulic control system 10, in the illustrated embodiment a time division multiplexed (TDM) system having a plurality of channels, FIG. 1 illustrating a relatively simple system having only three channels 12, 14, 16. A control means, illustrated as microprocessor 18, coordinates the elements of the system and establishes control set points and control signals for positioning actuators in each of the channels. The actuators in turn, may be used to control physical elements such as jet aircraft control devices which establish fuel feed rate, variable engine geometry positions, etc.

The microprocessor 18 receives an electrical input signal for each channel on input lines 20, 22, 24 and processes those input demand signals along with feedback signals and the like to produce a control signal for each channel which is related to the demanded position of the actuator in the channel. Those control signals are output on a TDM bus 26 in respective time slots and transmitted on the bus 26 to a hydraulic control 28 shown herein as a pilot valve. The pilot valve in FIG. 1 is only schematically illustrated, but for the moment it is sufficient to understand that the pilot valve responds to each of the electrical signals in sequence on the TDM bus 26 to produce a sequence of hydraulic signals which are output in conduit 30. The hydraulic signals in the conduit 30 are representative of the electrical signals on the bus 26 and are in the same sequence, one for each of the channels in the system.

In practicing the invention, the hydraulic signals in the conduit 30 are distributed to the respective channels for effective control of the actuator in each channel. More particularly, the conduit 30 has its output coupled to a distribution means, in the illustrated embodiment shown as a rotary commutator 31 having a plurality of outputs 32, 34, 36. It is seen that the commutator has an open segment or slot 31a such that rotation of the commutator 31 sequentially connects the hydraulic signals in the conduit 30 via the open segment 31a to the output ports 32, 34, 36. A position feedback device 38 detects the position of the commutator 31 and transmits a position signal on line 39 to the microprocessor 18 so that the microprocessor controls the time slots of the electrical signals on the bus 26 to correspond to connections between the commutator slot 31a and the associated outlet ports 32, 34, 36.

As pointed out above, most practical systems, because of the limitations on the size of the pilot valve port, the size limitations associated with the conducting segment 31a of the commutator, and the further fact that the hydraulic signals produced by the pilot valve are multiplexed rather than continuous, the flow rates for each channel from the commutator are typically insufficient for driving the associated actuators. In accordance with the invention, amplification means in the form of second stage valves are disposed in each of the multiplexed channels and are associated with control elements to stabilize the loop without the need for multiple mechanical feedback linkages from the second stage valves to the single multiplexed pilot valve. In the illustrated embodiment, the amplification means are shown as second stage valves 42, 44, 46, one in each of the channels 12, 14, 16, and each being supplied with hydraulic signals from the commutator 31 by means of interconnecting conduits 33, 35, 37. The second stage valves in turn supply fluid through outlet ports 62, 64, 66 to associated actuators 72, 74, 76 via conduit 63, 65, 67. Each of the actuators has an internal piston with connected rod 71, 73, 75, the position of which is controlled by the amount of fluid in the piston cylinder. An intermediate source of pressure PCR is coupled to the upper side of the actuator pistons to serve as a sort of hydraulic spring and force the piston downwardly when fluid is withdrawn from the lower chamber or to allow the piston to rise when additional fluid is pumped into the lower chamber. Each actuator has a feedback means 82, 84, 86 coupled thereto for providing an electrical feedback signal to the microprocessor 18 by way of electrical connections 81, 83, 85, respectively.

The detailed structure of exemplary second stage valves will be described below. Suffice it for the moment to note, referring to valve 42 as exemplary, that each valve includes a chamber 50 which integrates the multiplexed output flow from the pilot valve to control the position of a spool 52. The opposite chamber 54 in the second stage valve is vented to sump (PB) and may be spring-biased against the pressure in chamber 50. It is seen that the second stage valve has two inputs, a first 56 being connected to the high pressure hydraulic source PC and a second 58 being connected to the hydraulic sump PB. As has been noted above, the outlet port of each second stage valve is connected to the inlet port of its associated actuator. Thus, when the second stage valve 42 is in the position illustrated in FIG. 1, the outlet port 62 is closed and the actuator 72 remains in the position previously set.

When the pilot valve supplies additional fluid to the chamber 50, the spool is forced higher to a position such as that illustrated by second stage valve 44, i.e., the valve in channel 14. It is seen that the raised spool opens the valve by a controlled amount allowing fluid flow from high pressure source PC through the port 64 to the actuator 74. The flow rate through the second stage valve depends on the degree to which the spool is raised, the further up, the more open the port, and the greater the rate of fluid flow to the actuator. Thus, the actuator 74 integrates the fluid flow from the second stage valve to control the position of the actuator element 73.

Similarly, when the hydraulic control signal from the pilot valve is a negative or sump signal, fluid is drained from the chamber 50 and the spool moves downwardly. When the spool is at a position lower than the closed position of valve 42, such as the position illustrated for valve 46, the output port 66 is connected to the hydraulic sump PB, thereby draining fluid from the actuator 76 at a rate controlled by the degree of opening of the port 66. The difference in flow rate to the actuator is illustrated in FIG. 1 by showing the valve 46 opened to a greater extent than valve 44.

Two features of the invention should be apparent at this point. First of all, a rather small quantity of fluid through the pilot valve is integrated by the associated second stage valve to control a much larger flow rate directly from the source PC or sump PB through the second stage valve outlet port. Secondly, the flow is continuous whether or not the pilot valve is servicing the second stage valve at a particular instant. More particularly, the second stage valve only changes position when additional fluid is sent to or removed from the chamber 50, but the second stage valve is locked in its last position, and thus can continue to supply fluid to the actuator, even when the pilot is not servicing the second stage valve. Thus, each second stage valve can be considered a hydraulic sample a device which integrates flow from the pilot while it is being serviced, and is locked in its last position at all other times. The substantial increase in fluid flow rate to the actuator, as compared to the comparatively smaller fluid flow rate through the commutator, will now be apparent.

In accordance with an important aspect of the invention, each of the actuators 72, 74, 76 has associated therewith a feedback device 82, 84, 86 for providing not only position feedback to the control system but also rate feedback to the microprocessor 18 for stabilizing the control loop. It is now appreciated that the control loop includes two series integrators, i.e., the second stage valve which integrates flow from the commutator, and the actuator which integrates flow from the second stage valve, and that basic control theory teaches that a control loop including two series integrators is potentially unstable. It is for that reason that non-multiplexed second stage valves have used feedback in the form of mechanical coupling between the pilot and second stage. But according to the present invention, those devices are mechanically uncoupled in order to share a single pilot valve among a plurality of channels. Accordingly, and in accordance with the invention, rate position feedback, i.e., proportional differential feedback, from the actuator in each channel is fed back to the controller, and such rate feedback is an important element in stabilizing the loop.

The transducers 82, 84, 86 may be simple potentiometers which produce an electrical output signal dependent upon the position (or change of position) of the actuator members. Signal lines 81, 83, 85 from each of the feedback devices are coupled back to the microprocessor 18. Thus, this signals provide the microprocessor information on the absolute position of the actuator for comparison with the demand input signals on lines 20, 22 and 24 so that microprocessor can produce appropriate output signals on the bus 26 for demanding changes in the rate of travel of the actuators. Furthermore, the signals on lines 81, 83 and 85 are interpreted by the microprocessor 18 to determine rate of movement of the actuator members 71, 73, 75, and that rate information is used in the feedback system as will be described below to modify the output signals in such a way as to insure stability of each of the loops.

With that basic understanding of the system in mind, attention will now be directed to certain of the individual elements which make up the overall FIG. 1 system. More particularly, turning to FIG. 2, there is shown partly in schematic form, an embodiment of a multiplexed pilot valve exemplifying the present invention. In the illustrated embodiment the pilot valve and commutator are in a unitary assembly in which the pilot valve controls the position of a spool for opening or closing a port while a rotary commutator rotates to sequence the thus-controlled port to a plurality of outputs.

Figure 2:
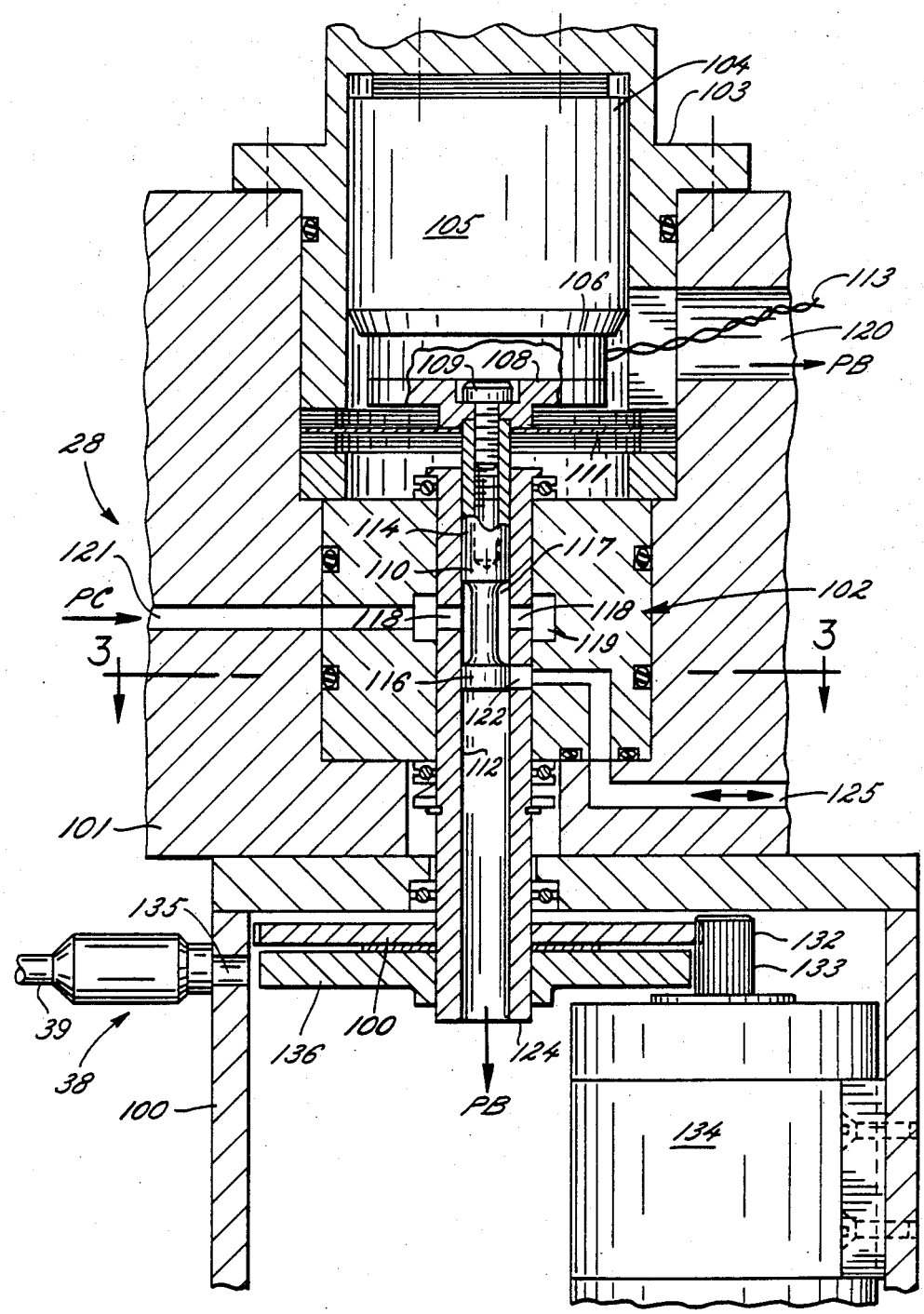
FIG. 2 illustrates in greater detail the multiplexing pilot valve of the system of FIG. 1.

As shown in FIG. 2, the pilot valve assembly 28 is built on a base member 100 which carries a valve body 101 having a plurality of ports therein. Mounted within the valve body 101 is a valve insert generally indicated at 102 which includes both the pilot control member as well as the multiplexing assembly. A driver housing 103 is mounted on the valve body 101 and carries a linear actuator 104 for controlling the position of a spool valve within the valve insert 102.

In practicing the invention, the actuator 104 comprises a relatively high speed, low mass linear device having a position which can be relatively precisely controlled, and of the type which has a high cycle life commensurate with the frequent repositioning typical of multiplexed hydraulic systems. It is preferred to use a linear actuator 104 in the form of a voice coil, i.e., a magnetic driver typically used in audio speakers. The voice coil 104 has a stator assembly 105 which includes the usual magnet and a low mass movable actuator 106 which in normal operation contains the coil and is typically connected to a speaker cone. In the illustrated embodiment, however, a flanged disc 108 is connected to the movable member and secures an enlarged head 109 which is attached to the spool 110 of valve 102. The stator 105 is affixed to the driver housing, while the movable voice coil member with attached spool components is supported by a resilient spring 111. If desired, a biasing mechanism for adjusting the null position of the pilot valve can be associated with the spring support 111. It is seen that vertically positioning the movable member 106 by means of energizing the voice coil serves to raise or lower the spool in a valve bore generally indicated at 112.

Before turning to the details of the porting arrangement, it will first be noted that a pair of wires 113 carry signals to the coil of the voice coil and thus control the position of the spool. The wires 113 can thus be considered a part of the TDM bus 26 of FIG. 1 and, it is recalled therefore, carry a sequence of signals in time division multiplexed fashion relating to the demand adjustment for each of the second stage valves in the system.

Referring now to the valve itself, it is seen that the spool 110 has an enlarged cylindrical portion 114 closely fitting within the bore 112 and a second enlarged metering land 116 which also closely fits within the bore 112. Between those enlarged portions is formed a chamber 117, which is connected by way of a series of ports 118 in communication with cylindrical chamber 119 in the valve insert to an inlet line 121. In the illustrated embodiment a positive source of hydraulic pressure designated PC is connected to the inlet port. Similarly, a hydraulic sump, designated PB, is connected to the internal bore 112 and, via a conduit 120, to the upper end of the spool for equalizing pressures thereon.

Turning now to the pilot valve mechanism itself, it is seen that the metering land 116 in the illustrated position closes a port 122 positioned in a rotatable sleeve 124. It will also be appreciated that with the hydraulic system connected as described above, positive hydraulic pressure is maintained in the chamber 117 on the upper side of the metering land 116, and sump is maintained at the lower side of the metering land. Accordingly, when a signal on the TDM bus causes the voice coil 104 to raise the spool from its illustrated position, the sump is connected through the port 122 to an outlet conduit 125. The conduit 125 delivers controlled hydraulic fluid to the second stage valve in its associated channel. With the metering-land raised above the illustrated position, the sump is connected to outlet conduit 125 to cause the second stage valve to move in accordance with that hydraulic signal. The rate at which the second stage valve moves is determined by the degree to which port 122 is opened which in turn is a function of the degree to which the spool is raised which in turn is a function of the magnitude of the electrical signal on the TDM bus 113.

In a similar fashion, when a signal on the TDM bus of the appropriate magnitude and polarity is received, the spool 116 is driven in a downward direction, thus opening the outlet conduit 125 to the high pressure chamber 117. Thus, hydraulic fluid will flow through the port 122 to the second stage valve to move the valve in accordance with that flow, and as in the previous case, the flow rate will be determined by the degree to which the port 122 is opened, which is a function of the vertical position of the spool which in turn is a functional of the magnitude of the electrical signal on the bus 113.

Figure 3:
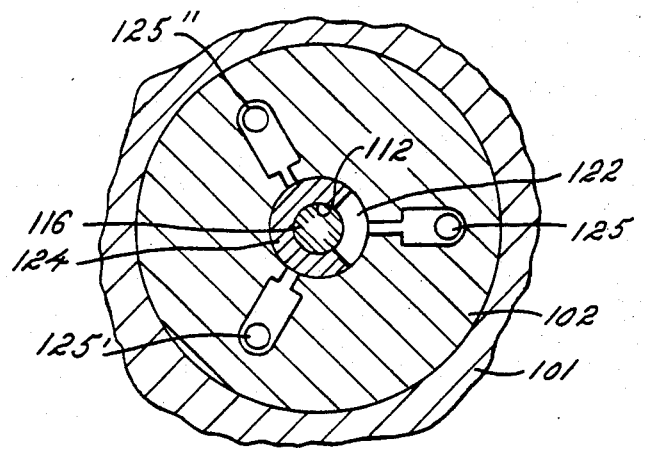
FIG. 3 is a view taken along the line 3—3 of FIG. 2 showing the rotary commutator and associated porting of the multiplexing pilot valve.

In practicing the invention, the port 122 is shared between a plurality or hydraulic outputs, only one of which is illustrated in FIG. 2. In the illustrated embodiment port multiplexing is accomplished by rotating the sleeve 124 carrying port 122 to sequence the port 122 among a plurality of output ports distributed in a circular array around the valve insert 102. Referring more particularly to FIG. 3, there is shown a partial cross-section through the metering land 116 and port 122. It is seen that the valve insert 112 in the illustrated embodiment includes three ports 125, 125', 125". The metering land 116 is shown fitted within the bore 112 formed in the rotatable sleeve 124. The port 122 is shown as approximately a 90° segment removed from the sleeve so that when the spool is in the position illustrated in FIG. 2, the port 122 is closed, whereas when the spool is moved vertically from its rest position, the port 122 is open by a controlled amount. In the position illustrated in FIG. 3, the commutator is servicing the channel associated with port 125. Assuming clockwise rotation of sleeve 124 and therefore port 122, the port 125 would next be closed, then after the metering land 116 is positioned to a new position associated with the next channel, continued rotation of the port 122 connects the second outlet port 125' to the hydraulic source as controlled by the pilot valve. Similarly, continued rotation closes the port 125', allowing repositioning of the spool for the new channel, then opens the port 125". The sequence continually repeats with the signals provided to the voice coil 104 in timed synchronism with the rotary position of the port 122 to controllably produce and distribute a series of hydraulic signals to each or the hydraulic channels.

Returning to FIG. 2, it is seen that rotation of the sleeve 124 is accomplished in the illustrated embodiment by means of a gear 130 affixed to the sleeve 124 and engaging a similar gear 132 on the shaft 133 of a driving motor 134. The sleeve is shown mounted with appropriate bearings and seals which need not be described in detail for an understanding of the invention. Energization of the motor 134, by virtue of the engaged gears, serves to rotate the sleeve 124 at a controlled rate to provide a plurality of controlled hydraulic signals for the respective channels from the multiplexed hydraulic source. It is also noted that a separate drive motor is not necessary; in some applications the commutator can be rotated by a drive taken off the controlled device, such as a controlled gas turbine engine.

Further in practicing the invention, means 38 are provided for sensing the rotary position of the port 122 to produce a signal utilized by the controlling processor to assure that the TDM electrical signals provided to the electrical actuator are coordinated with the rotary position of the commutator. In the illustrated embodiment, the sensing means 38 includes an electrical position sensor 135, which may be magnetic or photoelectric facing a gear or wheel 136 having position information encoded thereon and affixed for rotation with the sleeve 124. Thus, the sensor 135 can read actual position information from the wheel 136. An electrical signal is generated by the sensor 135 and coupled to the microprocessor 18 (FIG. 1) by way of cable 39, to provide accurate commutator position information to the processor so that it can perform its coordination function.

Returning briefly to FIG. 1, it will now be appreciated that what has been described is an exemplary embodiment of the system common elements including the pilot valve 28 and its relationship to the rotary commutator 31, as well as the relationship of position sensor 38 and its control through the microprocessor 18. Those elements it will now be appreciated produce separate hydraulic control signals, one for each channel, that are conveyed in conduits 32, 34, 36 for each of the channels to second stage valves located in those channels.

Figure 4:
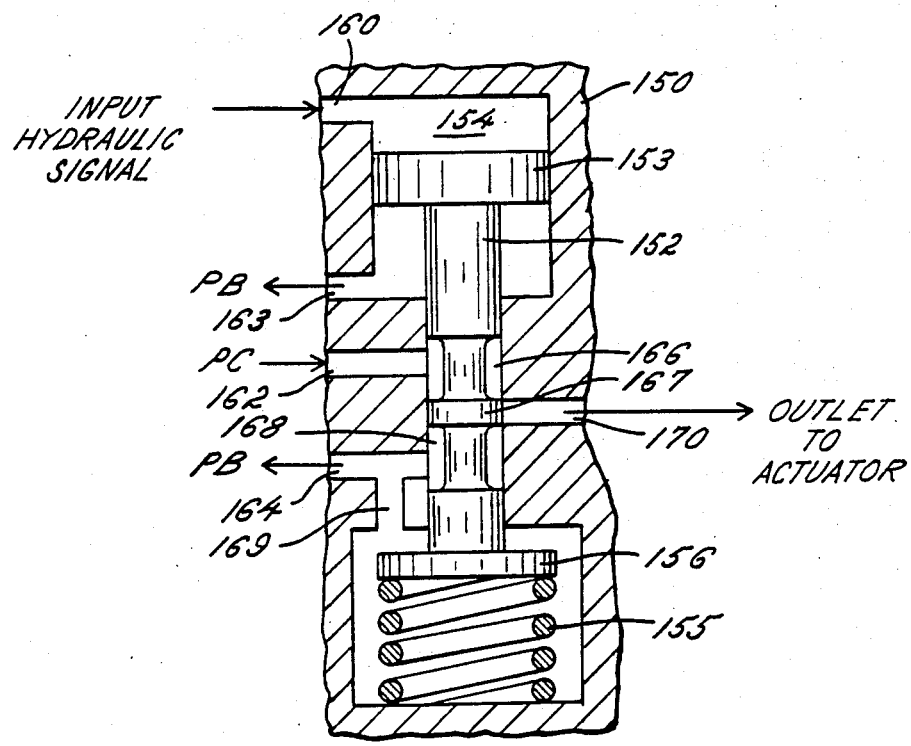
FIG. 4 illustrates in greater detail the structure of a second stage valve of the system of FIG. 1.

Attention will now be directed to FIG. 4 which illustrates, partially in schematic form, an exemplary second stage valve for use in the system of FIG. 1. It is seen that the exemplary second stage valve is also a spool valve having a valve body 150 in which rides a spool 152. The illustrated valve is of the single acting type having a piston 153 controlled by fluid delivered to a chamber 154, and the return stroke controlled by a return spring 155 acting on land 156 on the spool 152.

When the second stage valve is connected in the system, it receives a hydraulic input signal in a port 160 which, as will be appreciated, can be connected for example to one of the outlet conduits 125, 125' or 125" of the FIG. 3 commutator. Positive hydraulic source PC is connected to a central port 162 whereas the hydraulic sump PB is connected to upper and lower ports 163, 164. The sump is connected to port 163 to relieve the pressure in the chamber below the piston 153 as it moves downwardly. The hydraulic source PC via port 162 and sump PB via port 164 are connected to chambers 166, 168 respectively, separated by a metering land 167 on the spool. It is noted that the sump is also connected through a further port 169 to the return assembly for relieving the pressure therein as the piston 156 moves downwardly. An outlet port 170 is connected to the actuator in the associated channel.

When the second stage valve is in the position illustrated in FIG. 4, the outlet port 170 is closed to both the positive source of hydraulic pressure PC and the sump PB. As will be appreciated, that can be considered the rest position in which there is no fluid flow to the actuator and the actuator remains in its previously established position. When a positive hydraulic signal is applied to the inlet port 160, the piston 153 and associated spool is forced downwardly. Movement of the metering land 167 downwardly causes the source PC in the chamber 166 to be connected to the outlet port 170. The rate of flow through the port is controlled by the vertical position of the spool. The more the spool is forced downwardly, the further the outlet port is opened, and the higher the flow rate to the actuator. Similarly, when negative hydraulic signals remove fluid from the chamber 154, the spool moves upwardly. When the spool is raised above the position shown in FIG. 4, the hydraulic sump is connected through the chamber 168 to the outlet port 170, bleeding hydraulic fluid from the actuator and causing it to return in the direction opposite to that just described above. Again, the rate of actuator movement will depend on the position of the spool and the associated degree of opening of the outlet port.

According to an important feature of the invention, the signals which are applied as hydraulic inputs to the second stage valves, i.e., to port 160, are discontinuous by virtue of the hydraulic multiplexing, but the second stage valves function as hydraulic sample and hold devices which produce output signals which are continuous by virtue of the fact that the second stage valves are locked in their previously set positions between adjustment cycles.

For example, consider a case where the microprocessor 18 of FIG. 1 desires to move the actuator associated with a particular channel at a relatively rapid rate in the advance direction. Just prior to the commutator sequencing to the port associated with that channel, the pilot valve spool is positioned to apply a relatively high magnitude positive hydraulic signal to the associated second stage valve. That hydraulic signal and each subsequent hydraulic signal in each further time slot for that channel will be accumulated (or integrated) in the chamber 154 to drive the spool of the second stage valve downwardly. Thus, a first signal will move the spool of the second stage valve downwardly, which provides a positive flow to the actuator causing the actuator piston to advance. It will be recalled that a feedback device on the actuator couples the signal back to the processor so the processor can determine how quickly the actuator is moving. If it is not moving quickly enough for the desired conditions, on the next cycle associated with the channel in question, a further positive signal will be sent to the second stage valve driving the spool even further downwardly. The piston will be locked in that position while the other channels are serviced, and the flow to the actuator during that time will be increased beyond that of the previous cycle. Further additional positive pulses can be coupled to the second stage valve which result in ever-increasing flow rate until the rate of actuator movement as determined by the feedback matches that desired by the processor. When the processor desires to reduce the speed of advance of the actuator or to stop or reverse it, hydraulic signals of the opposite polarity are sent to the second stage valve for that channel to relieve the fluid from the chamber 154, thereby raising the spool to reduce, stop or reverse the flow rate to the actuator.

The fact that each channel of the system comprises two integrators in series, and that such a system is potentially unstable has been noted. First of all, the hydraulic signals from the pilot valve, generated on a time multiplexed basis, are accumulated or integrated in the actuating chamber 154 of the second stage valve. The accumulation of those hydraulic signals establishes a position for the second stage valve spool, which in turn establishes a flow rate to the actuator. The actuator in turn accumulates or integrates the flow from the second stage valve. Basic control theory teaches that operating two integrators in series in that fashion can be potentially unstable. However, to remove one of the integrators, i.e., the second stage valve, would render the system response time unacceptable. In accordance with the invention, the two series connected accumulators are utilized, but feedback is provided around the loop which includes the multiplexed components to assure system stability. In the embodiment illustrated in FIG. 1, a position transducer is connected to each of the actuators in each of the channels, and a signal is derived from each of those actuators and coupled back to the microprocessor. As will be described in greater detail below, a lead/lag controller is associated with the processor. Such a controller provides not only actual position information for use in the control circuit for assuring that the demanded position matches the actual position, but also provides rate feedback which relates to the rate of the movement of the actuator. That rate feedback is utilized in the control loop to provide a signal relating to rate of movement of the actuator which in turn is utilized to stabilize the system. It can be demonstrated that the rate of movement of the actuator is directly related to the position of the second stage valve (since the latter determines the former) and therefore the rate feedback from the actuator provides an indirect measure of second stage valve position which is useful for control system stability. That is achieved in spite of the fact that the common elements of the system, i.e., the pilot valve and commutator, are an element of each of the multiple control loops on a time shared basis. By virtue of this indirect electrical feedback from the actuator, the second stage valve and pilot valve need not be associated on a one-to-one basis, need not be mounted on the same assembly, and require no direct mechanical feedback as has been typical in the past.

Figure 5:
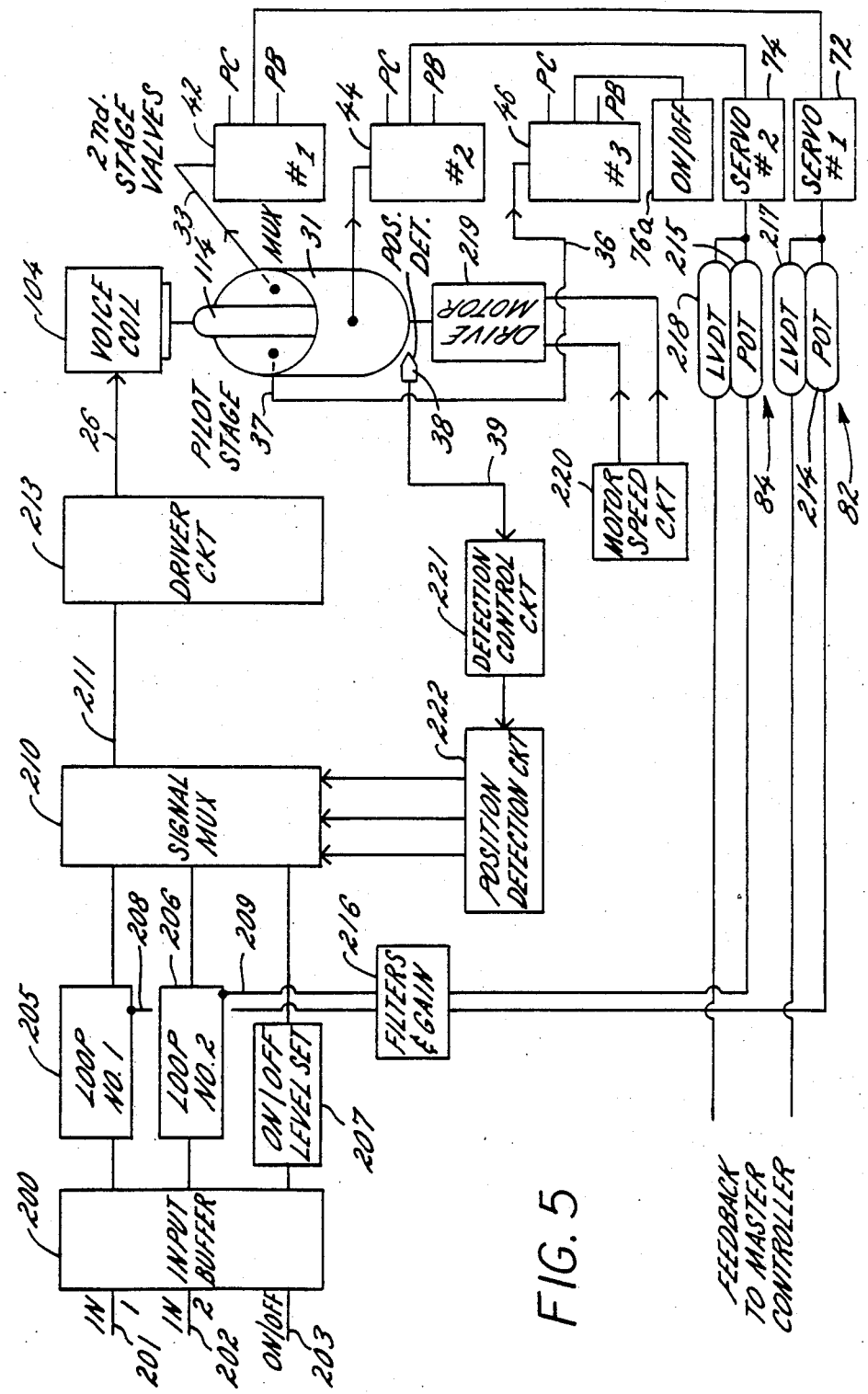
FIG. 5 is a block diagram showing an exemplary hydraulic multiplexed system associated with exemplary control circuitry.

Turning now to FIG. 5, there is shown a control loop for a three channel system similar to that disclosed above, but differing in the structure of one of the channels. More particularly, two of the channels include servo actuators and their associated position and rate feedback means, but a third channel illustrates a somewhat different control approach in that the actuator is a simple on/off device, and no feedback is required. The system illustrates that one or several on/off devices can be intermixed with controlled position actuators in the multiplexed control.

Referring in greater detail to FIG. 5, there is shown an input buffer circuit 200 having three input signals coupled thereto on lines 201–203. Two of the input signals are like those described in connection with FIG. 1, i.e., have levels (typically current levels) which relate to a demanded position for the associated actuator. A third signal on line 203 is simply an on/off signal which demands that the actuator in the associated channel be switched either on or off. The signals having passed through the buffer 200 are coupled to associated control loops 205, 206, 207. The loops 205 and 206 are similar in that they compare the associated input signal from the buffer with a feedback signal on lines 208, 209, respectively, for establishing an output signal which is proportional to the flow intended to be sent to the associated second stage valve in the next cycle. As noted above, the feedback signal is preferably both a position signal and a rate signal which, when combined with the input demand signal as will be described below, produces an output signal for controlling the associated actuator.

The on/off signal from the third channel is coupled to on/off level set controller 207, and in this case needs no feedback from the associated actuator. The three signals from the three controllers are coupled as inputs to a signal multiplexer 210 which has a single output bus 211 having a time slot for each of the signals. The signal multiplexer in conventional fashion samples the input signals on its input lines and places samples in associated time slots for output on the TDM bus 211. Those signals are amplified in a driver circuit 213 and coupled on a TDM bus 26 to the voice coil 104 of the pilot valve/multiplexer combination.

FIG. 5 shows the multiplexed pilot valve only schematically, including the vertically positionable spool 114 associated with the multiplexer 31. It is seen that three hydraulic outputs are provided on lines 33, 35 and 37, each being coupled to an associated second stage valve 42, 44, 46. As in the previous embodiments, the second stage valves 42 and 44 drive servo actuators 72, 74 having feedback means 82, 84 coupled in the control loop. The actuator 76a is an on/off actuator driven by the output of second stage valve 46. As shown in FIG. 5, a pair of feedback sensors may be provided for each servo actuator. The first includes potentiometers 214 and 215 which have signals passed through filter and gain circuitry 216 to serve as the feedback signals on lines 208 and 209. In addition, the feedback elements 82, 84 can include a second sensor illustrated as the LVDT sensors 217, 218 having lines coupled back as feedback to the master controller. The master controller may sense the position of the servos through the feedback means and adjust the demand signals on lines 201 and 202 to achieve actuator positions which might be computed by a master onboard computer.

Referring again to the multiplexer 31, it is driven by a motor 219 responsive to a driver circuit 220, the motor being coupled to the multiplexer for sequentially applying hydraulic output signals to the output channels 33, 35, 37. A position detector 38 is also associated with the rotating assembly for detecting the rotary position of the multiplexer and acting through detection control circuit 221 and position detection circuit 222 to provide signals which control the signal multiplexer 210. Thus, the actual position of the rotary multiplexer, and thereby of the output port with respect to the output channels, serves as a signal input which acts on the multiplexer 210 to control the time slots in which each of the electrical signals are placed. As a result, any delays in the control circuit can be compensated for so that the voice coil 104 drives the spool 114 to the position associated with a particular channel immediately before the multiplexer opens the port connecting the pilot valve to the channel.

Figure 6:
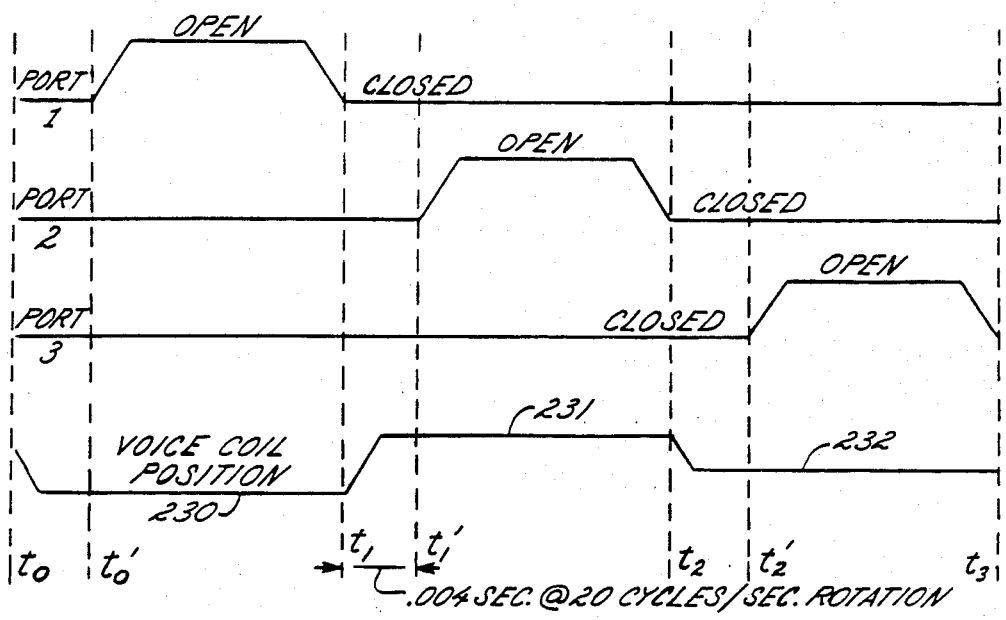
FIG. 6 is an exemplary timing diagram for a three actuator hydraulic multiplexed system.

System timing will be better appreciated upon reference to FIG. 6. There is shown a plot of multiplexer port connections and voice coil position as a function of time for a single cycle of the multiplexer. FIG. 6 assumes that the multiplexer is rotary and is being rotated at about 20 cycles per second. As such, in a three channel system, each of the time slots will be about 17 msec. In the scale of FIG. 6, for example, from $t_0$ to $t_1$ will be 17 msec, from $t_1$ and $t_2$ another 17 msec, etc. Each of the time slots is broken down into two parts, a first dwell time before the port begins to open, followed by a port opening and closing cycle. The dwell times in FIG. 6 are e.g., the time between $t_0$ and $t'_0$, and the port opening and closing cycle between e.g. $t'_0$ and $t_1$. Taking the first port as an example, it is seen that after the expiration of the dwell time, at time $t'_0$, the port begins to open, reaches a fully open position, then begins to close, and the port is fully closed at time $t_1$. The port remains closed until the reoccurrence of its time slot on the next cycle. As the multiplexer continues to rotate, a dwell time occurs between $t_1$ and $t'_1$ following which port 2 goes through an opening and closing cycle. Subsequently, after port 2 closes, and after the expiration of the dwell time from $t_2$ to $t'_2$, port 3 goes through its opening and closing cycle, following which the total cycle is repeated.

The lowermost plot of FIG. 6 illustrates the manner in which the voice coil operation is coordinated with the multiplexer rotation. FIG. 6 illustrates three positions for the voice coil, a first minimum magnitude position 230 during the first time slot, a second larger magnitude position at 231 during the second time slot, and a third intermediate position 232 during the third time slot. It will be appreciated that the levels are arbitrary, but are dependent on the magnitude of the input signals on the TDM bus used to control the voice coil and thus the pilot valve opening.

It is seen that in the dwell time from $t_1$ to $t'_1$, port 1 has completely closed and before port 2 has started opening, the voice coil is driven from the position associated with the first channel to the position associated with the second channel. In the illustrated system, a dwell time of approximately 4 msec is allowed for changing the position of the voice coil, well within the capabilities of such a device. And even with a time of that length allowed for repositioning the voice coil during the dwell time, the majority of the time slot (i.e., 13 of the 17 available milliseconds) is available for directing fluid flow through the multiplexer to the second stage valve in the selected channel.

Returning to FIG. 6, it is seen that port 2 begins to open after approximately the 4 msec dwell time, and after the voice coil has established its position at level 231 associated with the second channel. Thus, the fluid flow through the pilot valve is related to the level established by level 231, and the port opens to conduct the fluid at that flow rate to the second stage valve until the time $t_2$ at which point the second port is closed. At that point, the voice coil repositions to the level 232 and, after the expiration of the approximately 4 msec dwell time, the third port opens for conducting fluid at the rate established by the level 232.

It will thus be apparent that the illustrated pilot valve and multiplexer combination is capable of rapid repositioning from channel to channel to conduct reasonable amounts of control fluid suited to the demands of each channel at a comparatively rapid multiplexing rate. And furthermore, since each of the channels includes a second stage valve which integrates the series of control hydraulic pulses coupled through the multiplexer, flow through the second stage valve to the actuator is not only controlled, but can be at substantial flow rates.

Figure 7:
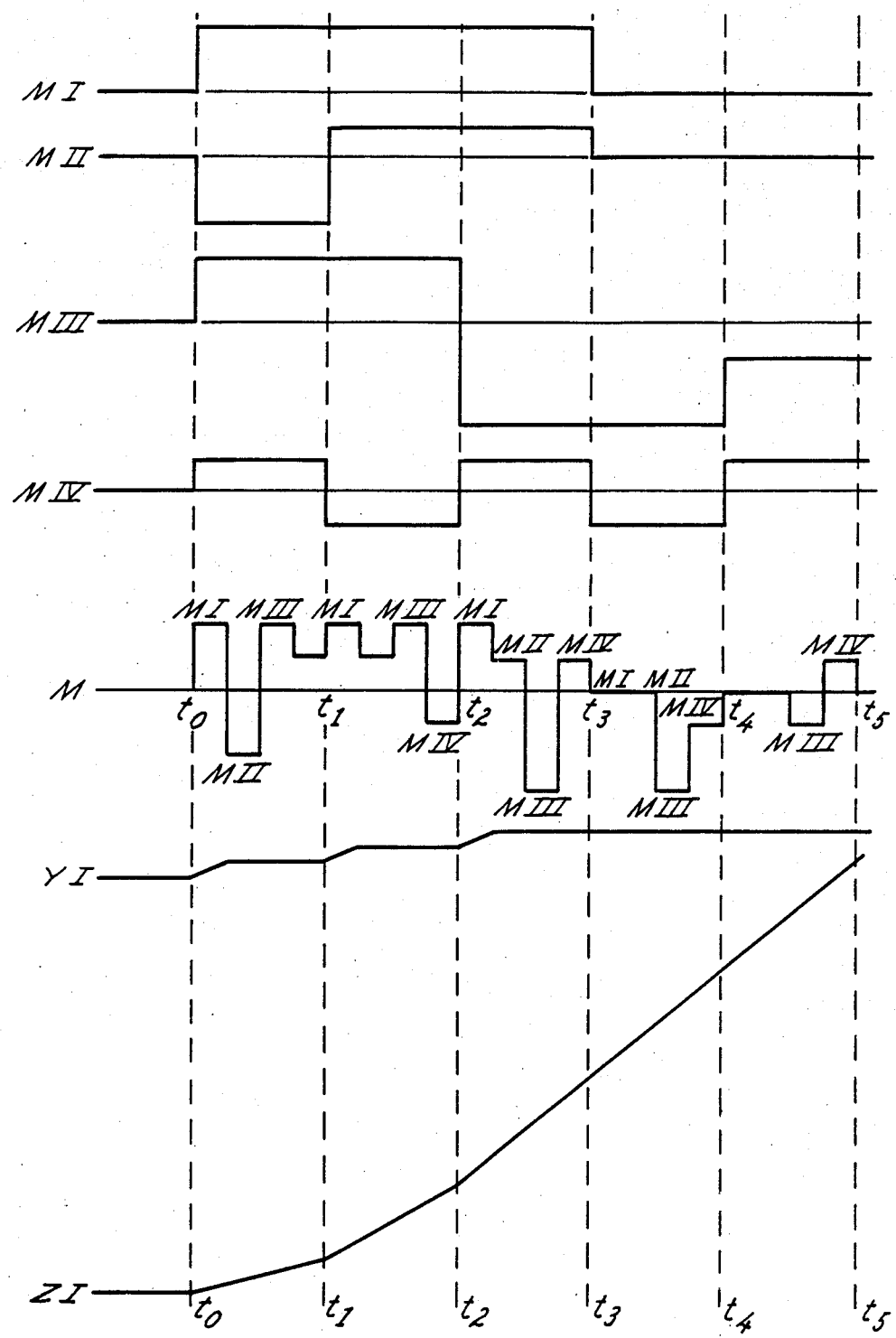
FIG. 7 is a further timing diagram illustrating hydraulic signals to the second stage valves in a three channel system, and in the case of one channel the response of the second stage valve and associated response of the actuator.

In fact, while the multiplexing causes pilot flow to each channel to be reduced by a factor related to the number of channels in the system, flow to the actuator and resultant speed of actuator position is not substantially sacrificed, as is aptly illustrated in FIG. 7. FIG. 7 shows a series of time slots for a 4-channel system. Each of the time slots $t_0$–$t_1$, $t_1$–$t_2$, etc. illustrates a complete cycle in which each of the four channels is serviced. The first four plots labeled MI–MIV illustrate the signal which it is desired to couple to the pilot valve for each of the four channels. For example, it is desired for channel I to transmit a control signal of positive magnitude whereas channel II desires a signal of about the same magnitude but in the negative direction. The plot labeled M illustrates the time multiplexed sequence in which each cycle, for example, $t_0$–$t_1$ is divided into four time slots, and a signal for each channel inserted in the slot associated with that channel. Thus, beginning at $t_0$ and ending at $t_1$, a first quarter of the cycle is related to the signal level for channel $M_I$, the second time slot for channel $M_{II}$, etc.

The plot labeled $Y_I$ illustrates the second stage valve position for channel I, it being appreciated that similar plots can be constructed for each of the other channels. It is seen that beginning at $t_0$ the second stage valve is advanced from its then rest position to a new position related to the magnitude of the input signal MI for channel I. At the end of the time slot related to channel I, the valve is locked in that position until the time slot reappears in the next cycle. At time $t_1$, a similar signal is applied so that the valve is advanced by a similar amount during the first time slot of the second cycle, then locked in position for the remainder of that cycle. A similar adjustment occurs at time $t_2$, further advancing the open position of the second stage valve. At times $t_3$ and $t_4$, the signal for channel I is zero, and thus the valve simply remains locked in the position in which it was left at the time $t_3$.

The final plot in FIG. 7 illustrates the substantial actuator movement which is achieved by the comparatively smaller adjustments applied to the second stage valve. It is seen that at time $t_0$ the actuator is in a given position and upon application of the first adjustment to the second stage valve at time $t_0$, it begins movement at a rate established by the amount of control fluid passed to the second stage valve during the first time slot of the first cycle. The actuator movement continues throughout that cycle at the rate established during the first time slot because the second stage valve is locked in position. At the time $t_1$, a second positive incremental adjustment is given to the second stage valve which increases the slope of the position plot ZI, demonstrating that the actuator not only continues to move in the same direction, but is moving at a higher rate. At time $t_2$, a further positive incremental advance is applied to the second stage valve which again increases the rate of actuator movement. Recalling that at times $t_3$ and $t_4$, no incremental adjustments are made to the second stage valve, it is seen that the actuator continues to move at the rate established at the time $t_2$, and will continue to do so until additional signals are applied to the second stage valve to either increase or decrease the actuator rate of movement. It will therefore be appreciated that although multiplexed signals to the various channels are limited by the fact of multiplexing, the actuator flow rates which can be controlled are indeed substantial, making such a control system practical for demanding high performance applications.

Figure 8:
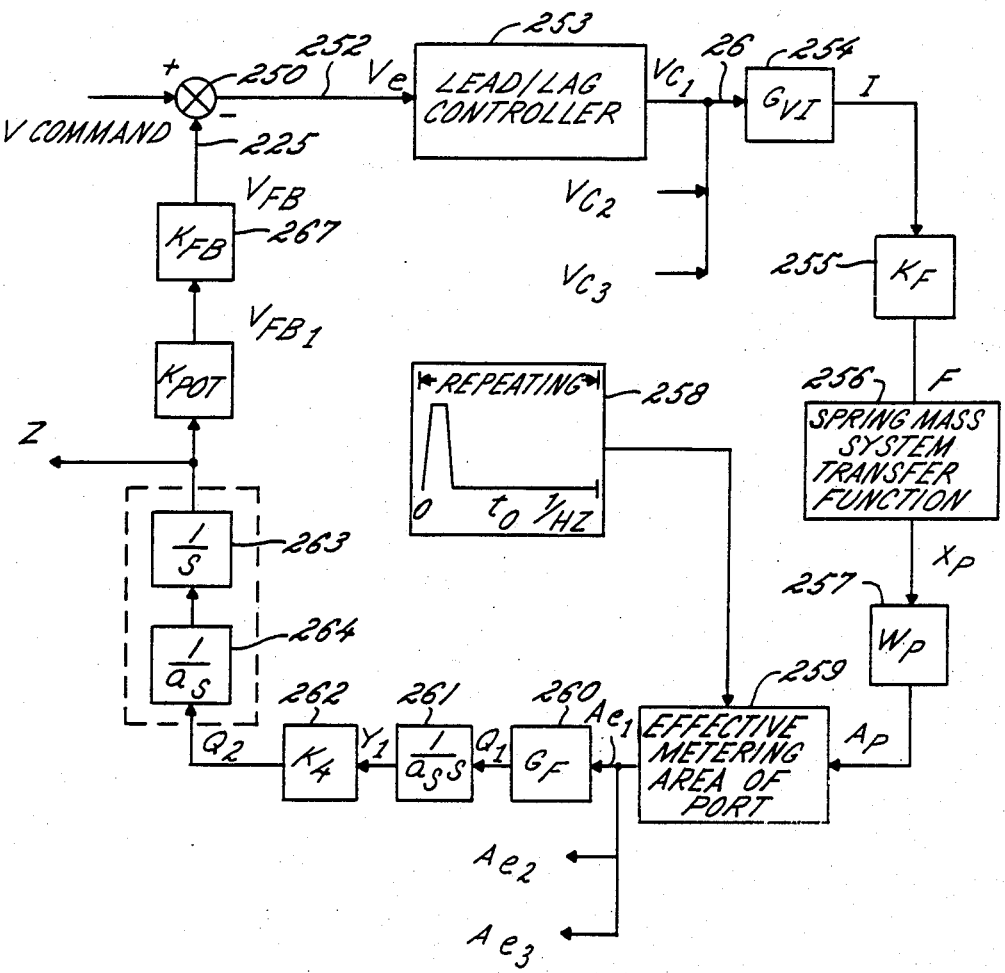
FIG. 8 is a block diagram illustrating an exemplary control loop for a multiplexed hydraulic system.

FIG. 8 illustrates additional aspects of the control loops. Whereas the FIG. 5 illustration of the control circuitry focused on the multiple channels and multiplexing aspect of the control loop, FIG. 8 focuses on the transfer functions and better illustrates the nature of the position and rate feedback. As will be pointed out, certain of the elements of FIG. 8 are actually multiplied on a one per channel basis whereas other elements in the control loop are shared multiplexed elements. It is seen that a command input signal $V_{command}$ is applied to a summing amplifier 250 which also has an actuator position feedback signal $V_{FB}$ applied thereto on a line 251. The summation of the signals in amplifier 250 produces an error signal $V_e$ on an output line 252. The error signal, which may be passed through a limiter if desired as can other of the signals, is then applied to a lead/lag controller 253. The lead/lag controller includes a transfer function characteristic of the actual system being implemented. However, in all cases it will be a lead/lag controller which implies that it gives not only position feedback but also rate feedback dependent upon the rate of change of the actuator position. It is the lead portion of the network which differentiates the error signal to produce this rate information which in turn is used to stabilize the loop. Alternatively, a separate sensor can be connected to the actuator and rate of change information measured separately from the actual position information. However, the lead/lag controller approach is presently preferred.

Just as there is one feedback signal per channel, there is one summing amplifier 250 and one lead/lag controller 253 for each channel. The lead/lag controller can be implemented in dedicated analog circuitry, one circuit for each channel, or in a microprocessor with information stored separately for each channel. In any event, it is important when configuring the control loop as illustrated in FIG. 8, there be one lead/lag controller per channel because that controller keeps track of historical information and utilizes that historical information in determining rate feedback. The output of each lead/lag controller is a control voltage $VC_1$, $VC_2$, etc. which are multiplexed into a single time division multiplexed bus 26 having the control signals in associated time slots.

The signals on the TDM bus are then applied to a stage 254 which is in the nature of an electrical output stage that produces an output current dependent upon the magnitude and polarity of the input voltage. The output current then is used to drive the pilot valve. The current I coupled to the actuator produces, as illustrated by transfer function 255, a given force on the linear actuator. That force acts on the spool valve and associated elements to position the pilot valve. The transfer function 256 represents the spring mass system transfer function for the pilot stage. The force F having been applied to that physical element produces a given position $X_P$ for the spool valve. The transfer function 257 denotes the width of the multiplexing port, and the vertical position $X_P$ when multiplied by the port width $W_P$ produces a port area which will be opened for the portion of the cycle assigned to the time slot for the channel in question.

It is recalled that the multiplexing port does not open or close instantaneously, and the transfer function 258 represents the open/close cycle for each port. The transfer function 259 takes into account the cycle transfer function 258 and the actual port opening AP to represent the effective metering area of the port per cycle $A_{e1}$, $A_{e2}$, etc. The effective metering area produces a given hydraulic flow per channel $Q_1$, $Q_2$, etc. by virtue of the transfer function 260 which relates output flow to effective metering area.

The transfer functions 261, 262 represent the amplification achieved by the second stage valve. In transfer function the operator 1/s denotes the integration of the pilot flow $Q_1$, and the factor $a_2$ the area of the piston of the second stage valve. Flow $Q_1$ into the second stage valve is transferred by the transfer function 261 into a second stage valve position $Y_1$. A transfer function 262 represents the gain achieved by the second stage valve, and the valve position when multiplied by that gain $K_4$ produces an output flow rate $Q_2$ to the associated actuator. The fact that the flow $Q_2$ is integrated is represented by the 1/s operator 263, and that the integration is accomplished in the actuator is indicated by the $1/a_s$ transfer function which represents the area of the actuator piston. The result of those operations is a position Z for the actuator. The Z output illustrated in the drawings suggests that the Z is the actual output work produced by the system. The feedback element attached to the actuator is represented by the transfer function 266 to produce a voltage signal $V_{FB1}$ (one per channel) relating to the position of the actuator. That feedback signal as described above is filtered and amplified, such filtering and amplification being represented by the transfer function 267 to produce a feedback signal $V_{FB}$ relating to actuator position. That is a signal which, it is recalled, is combined with the command signal in the summing amplifier 250 to produce the error signal which drives the controller.

The mechanical elements illustrated in the foregoing embodiments, when they have illustrated such detail, have been single-acting hydraulic elements. It is of course possible and often desirable to utilize double-acting elements including either or both double-acting second stage valves and double-acting actuators. The control elements illustrated in the foregoing embodiments are applicable to both single-acting and double-acting systems.

Figure 9:
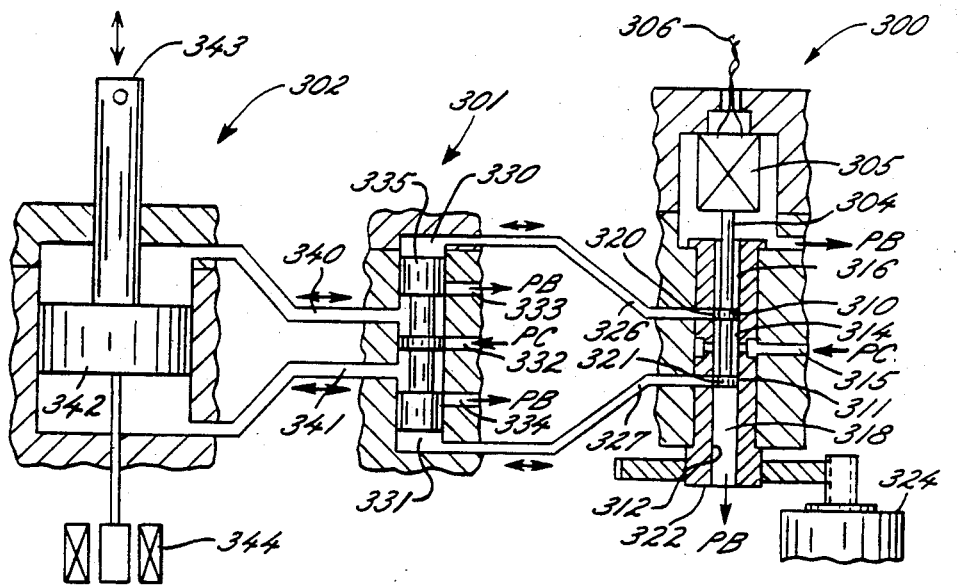
FIG. 9 is a schematic illustration of a doubleacting hydraulically multiplexed system showing the relationship between the pilot valve, second stage valve and actuator.

For the purpose of illustrating the manner in which double-acting mechanical elements are configured in such a system, FIG. 9 schematically illustrates an electrically operated multiplexed pilot valve 300 driving a double-acting second stage valve 301 which in turn drives a double-acting servo actuator 302. As in the prior embodiment, the pilot valve 300 has a linearly positionable spool 304 whose position is controlled by a voice coil 305. A pair of wire leads 306 pass multiplexed signals to the voice coil.

In contrast to the single-acting pilot valve which had only a single metering land, the pilot valve 300 has a pair of metering lands 310, 311 closely fitting but mounted for reciprocation within 310, 311 creates a chamber 314 within the bore 312. A port 315 serves as a connection point for high pressure hydraulic fluid PC. The hydraulic sump is connected to an upper chamber 316 above the metering land 310 and a lower chamber 318 below the metering land 311. The valve also has a pair of rotating commutator ports 320, 321 formed over a segment only of a rotatable sleeve 322. The sleeve 322 is rotated by a motor 324 just as in the FIG. 2 embodiment and also like FIG. 2 has a position sensor (not shown) for detecting the angular location of the ports 320, 321. The commutating ports 320, 321 are connected to outlet conduits 326, 327, respectively. It is seen that the conduits 326, 327 feed a pair of cylinders, upper cylinder 330 and lower cylinder 331 of a double-acting second stage valve. Thus, when the voice coil 305 of the pilot valve 300 is actuated to raise the spool 304, the metering lands 310, 311 move upwardly, opening the port 320 to high pressure hydraulic fluid PC and the port 321 to sump PB. In that condition, the second stage valve 301 will have its spool driven downwardly. Since hydraulic source PC is connected to an inlet port 332 of the second stage valve while the sump PB is connected to a pair of inlet ports 333, 334, when the spool, 335 of the second stage valve is driven downwardly, high pressure hydraulic fluid is passed to an upper outlet conduit 340 and sump is connected to a lower outlet conduit 341. In that condition, the piston 342 in the servo actuator 302 is driven downwardly retracting the piston rod 343. Also shown is an electrical feedback device 344 such as a potentiometer connected to the piston for sensing the actual position and rate of movement.

The servo actuator is advanced in a similar fashion. A signal is applied via bus 306 to the voice coil 305 which causes the spool to be driven downwardly. As a result, the high pressure source on inlet port 315 is connected through port 321 to the outlet conduit 327 whereas the sump PB is connected through the port 320 to the outlet conduit 326. As a result, the spool 335 of the second stage valve is driven upwardly, which connects the high pressure source of port 332 to the lower conduit 341 and the sump applied to port 333 to the outlet port 340. As a result, the piston 342 of the servo actuator is driven upwardly, advancing the piston rod 343, and the advance is sensed by the electrical feedback device 344.

It will be apparent from the foregoing description that when implemented in an actual system there will be a plurality of channels, each channel including a second stage valve 301 and a servo actuator 302, all driven by hydraulic signals generated by the pilot valve/commutator 300. But in contrast to the prior systems which move by hydraulic power in one direction and by spring return or the like in the other, in the present embodiment, both the second stage valve 301 and the servo actuator 302 are fluid driven in both directions. Of course, it is also possible to use a single-acting second stage valve with a dual-acting servo or vice-versa.

In some more complex systems, such as systems with a large number of channels, there is the possibility of increasing the size and therefore the mass of the spool valve beyond that which can be conveniently driven at a desired operating frequency by a voice coil. In such cases, it is preferred to practice the invention by associating hydraulic amplification means with the pilot valve, interposed between the electrical multiplexer and the spool of the pilot valve which produces the hydraulic signals for distribution to the second stage valves. An example of such hydraulic amplification means is illustrated in FIG. 10.

Figure 10:
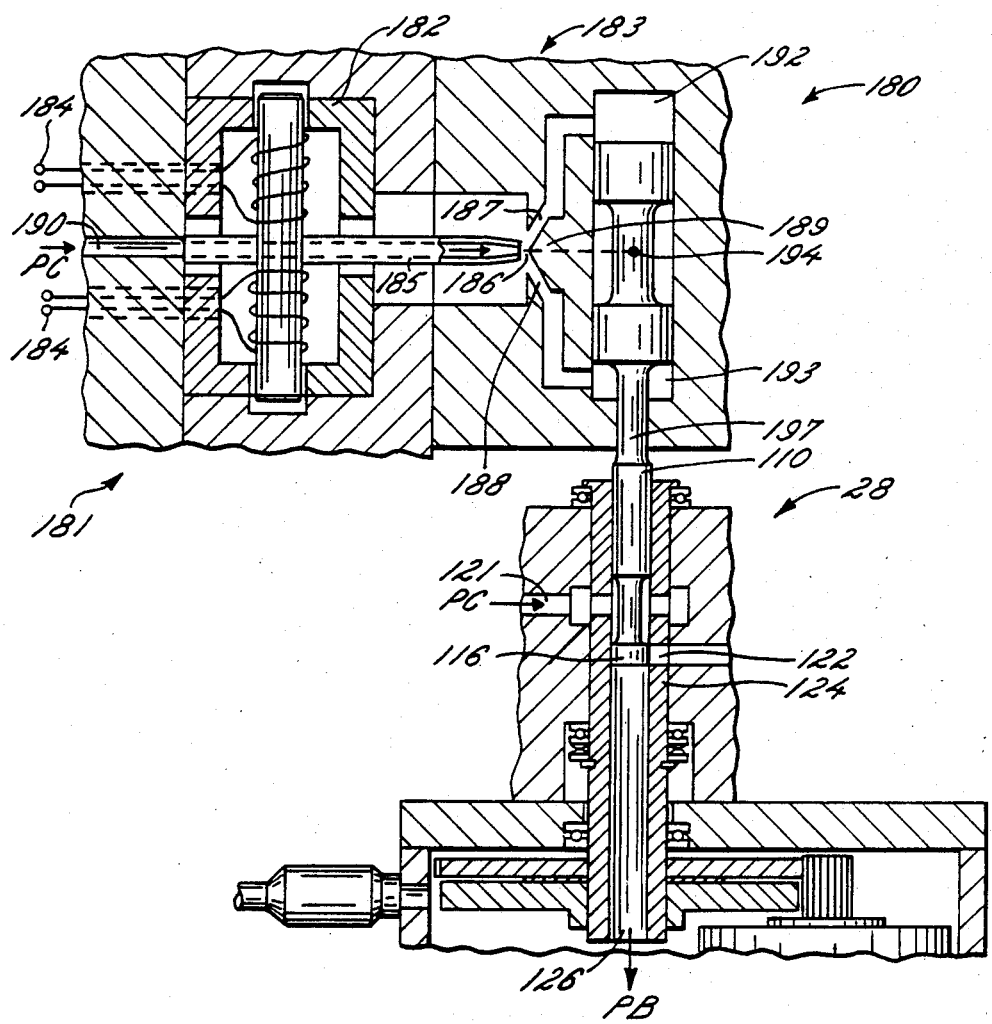
FIG. 10 is a diagram illustrating a pilot valve having hydraulic amplification means on the inlet side for enhancing the force on the spool valve achieved by the multiplexed electrical signals.

More particularly, FIG. 10 diagrammatically shows the pilot valve 28 having high pressure inlet port 121, sump port 126, spool 110, rotating sleeve 124, metering land 116 and multiplexed outlet port 122 as generally illustrated in connection with FIG. 2. However, rather than driving the spool 110 directly from the voice coil as illustrated in FIG. 2, the FIG. 10 implementation provides hydraulic amplification means 180 interposed between the pilot valve 28 and the electrical actuator 181 which drives it. In the FIG. 10 embodiment the hydraulic amplification means is illustrated as a torque motor 182 driving a jet pipe arrangement 183. Electrical input lines 184 convey the TDM electrical signals to the torque motor 182. The torque motor in turn is mechanically coupled to the jet pipe assembly 183 which has an orifice 186 at the end of a pipe 185 disposed intermediate a pair of pressure sensing orifices 187, 188. The jet pipe 185 has a hydraulic input 190 coupled to the high pressure hydraulic supply PC. Thus, hydraulic fluid is continually pumped into the inlet 190 and through the nozzle 186. With no signal on the torque motor, the jet pipe 185 is positioned with the nozzle 186 mid-way between the orifices 187, 188. Thus, the hydraulic fluid which is coupled through the inlet 190 will split evenly between the orifices 187, 188, creating equal pressures in the upper and lower chambers 192, 93 of an amplifying spool valve 194. As a result, the spool valve will be in its intermediate position. When an electrical signal is coupled to the torque motor via the input lines 184, the jet pipe 185 will be deflected either upwardly or downwardly, causing a different split in the hydraulic flow between the orifices 187, 188. Thus, if the jet pipe is deflected downwardly, the pressure in lower orifice 188 will increase with respect to that in upper orifice 187, driving the spool 194 upwardly. Similarly, if the jet pipe is deflected upwardly, the difference in pressure split between the two orifices will drive the spool 194 downwardly. A feedback spring 189 connects the spool 194 to the jet pipe 185, so the movement of the spool 194 has an effect on the jet pipe position. It is also seen that a mechanical connection 197 couples the spool 194 to the pilot valve spool 110, such that the pilot valve spool 110 will be positioned in response to signals applied to the torque motor 182. Since a comparatively smaller deflection in the jet pipe 185 will cause a comparatively larger movement in the spool 194, and since the spool 194 movement is coupled to the pilot valve spool 110, it will be appreciated that with the same size torque motor or voice coil, an electrical signal of a given magnitude will cause a greater deflection in the pilot valve spool 110, achieving the desired amplification effect.

In some installations, it will be convenient to locate the second stage valves remote from the pilot valve, such as near the location of the associated actuator. In those installations the high flow rate piping including second stage inlets and outlets will all be located near the actuator. In many installations, however, particularly where it is desired to decrease weight and size, it is desirable to mount the second stage valves very near the pilot valve.

Another factor which will now be readily apparent is the aforementioned size and weight reduction achieved by the present invention, a factor particularly useful in aircraft applications. For example, a 6 channel system constructed according to the prior art would have required 6 pilot valves, perhaps 6 second stage valves, and 6 actuators. By way of contrast, only a single pilot valve is used in the practice of the invention with relatively small second stage valves associated directly with the pilot valve, preferably in the same manifold.

For the sake of simplicity, the foregoing description has focused in large measure on a relatively small system, i.e., a 3-channel system. However, the number of channels which can be driven is by no means so limited in all cases. The factor which is important in considering how many channels can be driven by a single pilot valve in a given system is the frequency response which is required by the system. Application of the Nyquist criterion in conjunction with the frequency response demanded of the system will determine how many samples per second per channel are required in order to reproduce within desired tolerances the waveform of the most rapidly changing signal. In other words the number of channels is limited primarily by the type of control response desired, and can be much larger than the systems illustrated herein, although the underlying principles are the same.

It will now be apparent that what has been provided is a new means of hydraulic control in which an electrohydraulic actuator is driven by a TDM sequence of electrical signals to produce a series of hydraulic signals. Those hydraulic signals are distributed to a plurality of channels for controlling hydraulic flow in the channels. In order to achieve adequate hydraulic flow rates in each channel, each channel includes a second stage valve which integrates the hydraulic signals received for that channel and independently generates a flow to the associated actuator which is a function of the integrated hydraulic signals. The actuator which integrates the flow from the second stage valve has a feedback element associated with it and rate feedback taken from the actuator is used in the overall control system to stabilize the loop. In addition to loop stability, the processor keeps the electrical signals passed to the multiplexed hydraulic valve in time with the mechanical commutator which distributes the hydraulic signals, thereby providing a highly compact but very effective multiple channel hydraulic control system.

We claim as our invention:

1. A time multiplexed fluid power control system having a plurality of channels for individually controlling the positions of a plurality of actuators in the respective channels in accordance with a corresponding plurality of electrical control signals, the control system comprising the combination of:

pilot means responsive to the plurality of electrical control signals for producing a plurality of fluid power signals having magnitudes related to the magnitude of the electrical signals, multiplexing means for distributing the fluid power signals to the associated channels, integrating means in the channels responsive to the associated fluid power signal, each integrating means producing an output fluid flow rate determined by the time integral of fluid flow from the multiplexing means for its associated channel, the actuator in each channel being connected to receive the output fluid flow of the integrating means in that channel to control the position of each actuator in dependence upon the associated electrical signal for each channel, and feedback means for producing signals relating to the rate of movement of the actuators and modifying the electrical control signals in accordance therewith.

2. The combination as set forth in claim 1 wherein the time multiplexed fluid power control system is a hydraulic control system, and wherein the pilot means, multiplexing means, integrating means and actuators are hydraulic devices.

3. The combination as set forth in claim 2 further including position sensor means associated with each actuator, control means for establishing a set point for each actuator, the control means being responsive to the position sensing means for producing an error signal related to the difference between the set point and the actual actuator position, said control means including means for altering the electrical control signal for each channel in dependence on the error signal.

4. The combination as set forth in claim 4 wherein the control means includes means for altering the electrical control signal for each channel in dependence on the rate of change of actuator position.

5. The combination as set forth in claim 2, wherein the time multiplexed hydraulic control system is a time division multiplexed system, and wherein the multiplexing means comprises means for sequentially distributing the hydraulic signals to the associated channels.

6. The combination as set forth in claim 2 in which the pilot means includes hydraulic amplification means.

7. The combination as set forth in claim 1 wherein the time multiplexed fluid power control system is a time division multiplexed system, and wherein the multiplexing means comprises means for sequentially distributing the fluid power signals to the associated channels.

8. A time division multiplexed (TDM) fluid power control system having a plurality of channels for individually controlling the positions of a plurality of fluid power actuators in the respective channels in accordance with a corresponding plurality of electrical control signals, the TDM control system comprising the combination of:

pilot means sequentially responsive to the plurality of electrical signals, the pilot means including multiplexing means for sequentially producing pilot output signals comprising fluid flow rates for each channel in turn responsive to the respective electrical signals, integrating means responsive to each of the pilot output signals for integrating the fluid flow rates for each of the channels, each integrating means producing an output fluid flow rate determined by the time integral of fluid flow from the pilot means for its associated channel, the actuator in each channel being connected to receive the output fluid flow of the integrating means in that channel to control the position of each actuator in dependence upon the associated electrical signal for each channel, and feedback means for producing a signal relating to the rate of movement of the actuator and modifying the associated electrical control signal in accordance therewith.

9. The TDM fluid power control system as set forth in claim 8 in which the fluid power control system is a hydraulic control system, and in which the pilot means, integrating means and actuator are hydraulic devices.

10. The TDM fluid power control system as set forth in claim 9 in which the pilot means further includes hydraulic amplification means.

11. The TDM hydraulic control system as set forth in claim 9 wherein the hydraulic pilot means includes a controllably positionable spool for establishing the flow rates of the pilot output signals, and
 a voice coil coupled to the spool and connected to receive the plurality of electrical signals, thereby to control the position of the spool.

12. The TDM hydraulic control system as set forth in claim 11 wherein the pilot means includes hydraulic amplification means responsive to the plurality of electrical signals interposed between the voice coil and the spool for enhancing the force applied to the spool in response to said electrical signals.

13. The TDM hydraulic control system as set forth in claim 9 further including position sensor means associated with each actuator, control means for establishing a set point for each actuator, the control means being responsive to the position sensing means for producing an error signal related to the difference between the set point and the actual actuator position, said control means including means for altering said electrical input signal for each channel in dependence on the error signal.

14. The TDM hydraulic control system as set forth in claim 13 wherein the control means includes means for altering the electrical control signal for each channel in dependence on the rate of change of actuator position.

15. A time division multiplexed (TDM) fluid power control system having a plurality of channels for individually controlling the positions of a plurality of actuators in the respective channels in accordance with a corresponding plurality of electrical control signals, the TDM control system comprising the combination of:
 a multiplexing pilot valve having an electrical input and a plurality of fluid power outputs,
 control means responsive to the plurality of electrical control signals for sequentially applying multiplexed electrical signals to the electrical input of the pilot valve thereby to establish the magnitudes of each of the fluid power outputs,
 a plurality of second stage valves connected to receive the respective fluid power outputs, the second stage valves being connected as sample and hold devices to receive the associated fluid power output as a fluid power control signal to produce an output fluid flow rate dependent upon the received fluid power control signals, the second stage valves having no mechanical feedback coupling to the multiplexing pilot valve,
 the actuators being connected to the second stage valves and having positions controlled by the output fluid flow from the second stage valves,
 position sensor means coupled to the actuators for producing feedback signals relating to the positions of the respective actuators,
 the control means further including feedback means responsive to the feedback signals relating to the position of the actuator in each channel for modifying the multiplexed electrical signals for the respective channels before application to the pilot valve,
 the control means further including means for coordinating the application of the multiplexed electrical signals with the position of the multiplexing pilot valve.

16. The TDM fluid power control system as set forth in claim 15 including means for sensing the angular position of the multiplexing pilot valve and for producing a signal relating to said angular position, and means for feeding back said signal to the control means for coordinating the application of the multiplexed electrical signals with the position of the multiplexing pilot valve.

17. The TDM fluid power control system as set forth in claim 15 wherein the feedback means includes rate feedback from the position sensor means for stabilizing the control loop.

18. The TDM fluid power control system as set forth in claim 17 in which the fluid power is hydraulic.

19. The TDM fluid power control system as set forth in claim 18 wherein the control means includes a lead-/lag controller for deriving the rate feedback from the position sensor means.

20. The TDM fluid power control system as set forth in claim 18 further including a plurality of input demand signals for demanding a desired actuator position, wherein the feedback means further includes position feedback from the position sensor means for matching the actual actuator position to the demanded actuator position.

21. The TDM fluid power control system as set forth in claim 18 wherein the multiplexing pilot valve is a spool valve having a controllably positionable spool, and further including voice coil means coupled to the spool for responding to the electrical control signals to position the spool, thereby to establish the magnitudes of each of the hydraulic outputs.

22. The TDM fluid power control system as set forth in claim 21 in which the multiplexing pilot valve includes hydraulic amplification means interposed between the voice coil and the spool valve for enhancing the force applied to the spool valve in response to said electrical control signals.

23. The TDM fluid power control system as set forth in claim 21 wherein the multiplexing pilot valve further includes a rotatable sleeve having a central bore, the spool being located within the bore, the sleeve being ported and rotated to produce the plurality of hydraulic outputs.

24. A time division multiplexed (TDM) hydraulic control system having a plurality of channels for individually controlling the positions of a plurality of hydraulic actuators in the respective channels in accordance with a corresponding plurality of electrical control signals, the TDM control system comprising the combination of:
 a controller for producing a plurality of electrical signals containing magnitude information relating to demanded actuator positions for the plurality of actuators in the respective channels,
 a pilot valve for translating an electrical signal of a particular magnitude into a hydraulic signal having a flow rate related to the electrical magnitude,
 control means for sequentially coupling the electrical signals containing magnitude information to the pilot valve for producing a plurality of hydraulic signals for the respective channels, commutator means associated with the pilot valve and connected to distribute the plurality of hydraulic signals to the respective channels, a second stage valve in each channel for receiving and integrating and hydraulic signal for the associated channel whereby each second stage valve has a control position related to the time integral of its associated hydraulic signal, the second stage valve having output ports arranged so that the control position of the second stage valve establishes an output flow rate for the associated channel, the second stage valves having no mechanical feedback coupling to the pilot valve, an actuator in each channel coupled to the second stage valve output ports and having a position related to hydraulic flow received from the second stage valve, feedback means coupled to each actuator for producing a related feedback signal, and the control means including means for coordinating the commutator means and the control means to sequentially transmit hydraulic signals to each second stage valve to control the flow rate from the second stage valve and thereby the actuator position, the control means further including rate feedback means responsive to the plurality of feedback signals for stabilizing the multiplexed control loops.

25. The TDM hydraulic control system as set forth in claim 24 wherein the feedback means of the control means comprises a lead/lag controller.

26. The TDM hydraulic control system as set forth in claim 24 wherein the means for coordinating includes sensor means for detecting the position of the commutator means.

27. The TDM hydraulic control system as set forth in claim 24 wherein the control means further includes position feedback means responsive to the feedback signals for matching the actual actuator position to the demanded actuator position.

28. The TDM hydraulic control system as set forth in claim 24 wherein the second stage valves are positioned remotely from the commutator means, and including hydraulic connections for conveying hydraulic fluid from the commutator means to the plurality of second stage valves.

29. The TDM hydraulic control system as set forth in claim 24 wherein the pilot valve and the commutator means control the opening and closing of a common metering port thereby to form a multiplexing pilot valve.

30. The TDM hydraulic control system as set forth in claim 29 wherein the multiplexing pilot valve includes a controllably positionable spool for establishing the flow rate of the hydraulic signals, and a voice coil coupled to the spool and connected to receive the sequence of electrical signals containing magnitude information for controlling the position of the spool.

31. The TDM hydraulic control system as set forth in claim 30 wherein the multiplexing pilot valve includes a rotatable ported cylindrical sleeve carrying the controllably positionable spool, and means for rotating said sleeve for distributing said plurality of hydraulic signals.

32. The TDM hydraulic control system as set forth in claim 31 wherein the pilot valve includes hydraulic amplification means interposed between the voice coil and the controllably positionable spool for enhancing the force applied to said spool in response to the sequence of electrical signals.

33. The TDM hydraulic control system as set forth in claim 24 wherein the pilot valve has two multiplexed outputs for controllable connection to positive hydraulic pressure and sump in accordance with the position of the pilot valve, and the second stage valves are double-acting valves having a linear position established by both the pressure and sump samples received from the pilot valve.

34. The TDM hydraulic control system as set forth in claim 24 including ported connections between the pilot valve and each second stage valve, each ported connection having two conditions, a first condition in which the pilot valve is connected to the second stage valve for adjusting the position of the second stage valve, and a second position wherein the input hydraulic circuit of the second stage valve is sealed thereby to lock the second stage valve in its previously adjusted position.

* * * * *